E. Street,
Mortising Machine.
Nº 12,563.  Patented Mar. 20, 1855.
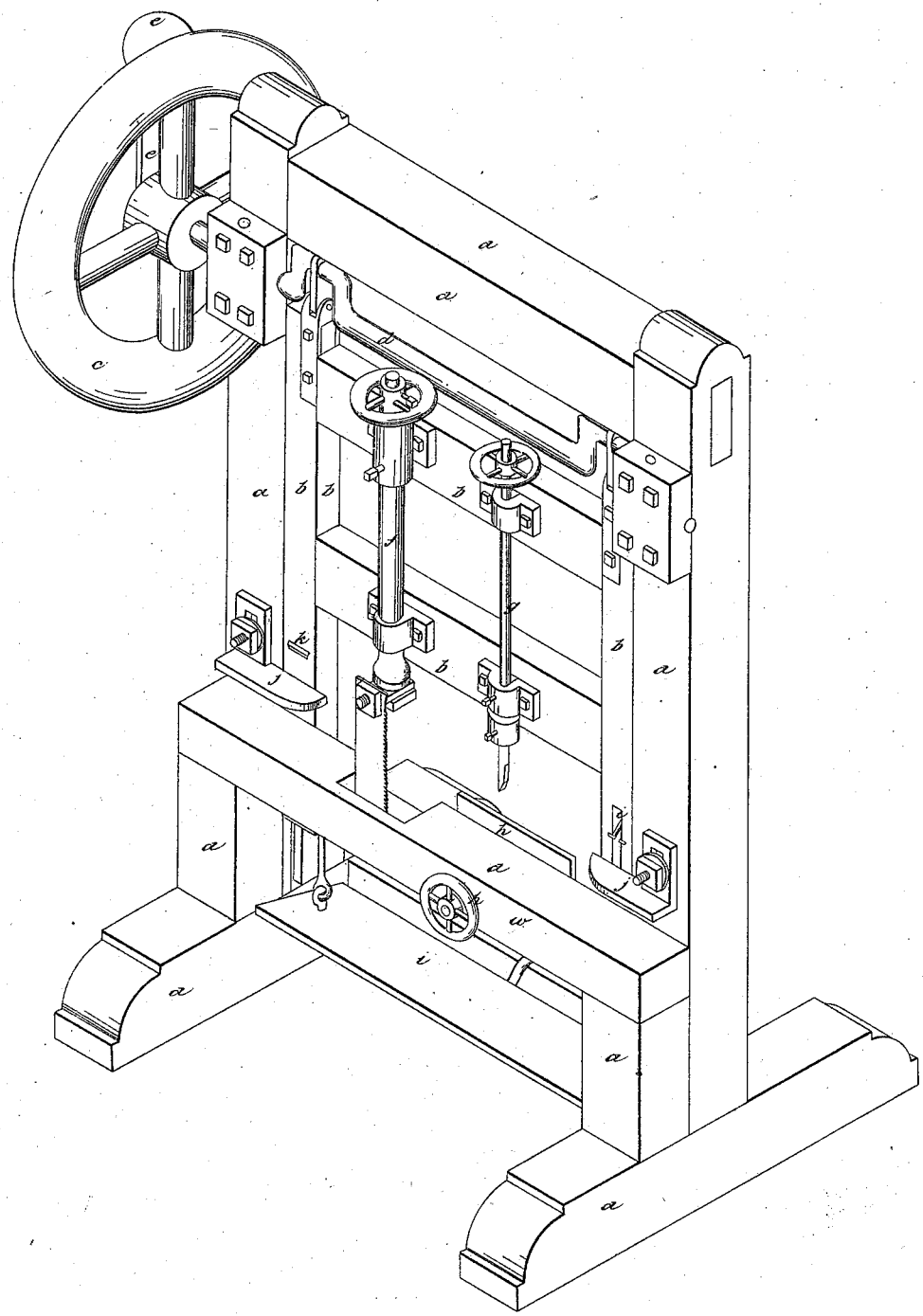

UNITED STATES PATENT OFFICE.

ELIHU STREET, OF MONTVILLE, CONNECTICUT.

MORTISING AND TENONING MACHINE.

Specification of Letters Patent No. 12,563, dated March 20, 1855.

*To all whom it may concern:*

Be it known that I, ELIHU STREET, of the town of Montville, county of New London, State of Connecticut, have invented a new and useful Improvement on a Machine for Mortising, Tenoning, Sawing, and Smoothing; and I do hereby declare that the following is a full and exact description thereof, reference being had to the accompanying drawings and to the letters of reference marked thereon.

The nature of my invention consists in the combination of certain tools used by carpenters in the manufacture of doors, sash, and blinds, in such a manner as to remove the great difficulty and delay or loss of time occasioned by continually removing from one machine to another and also the additional labor of removing the lumber calculated for use.

To enable others skilled in the art to make and use my invention, I will proceed to describe its connection and operation.

I construct or build a stationary frame as shown in the accompanying drawings marked: 1st, $a, a, a, a, a, a, a, a$, and apply thereto a slide frame, 2nd, $d, d, d, d, d$, into which insert or fasten a plane iron for cutting tenons on one side, marked, 12th L; On the other a plane iron for smoothing the ends of boards, marked, 11, K. Near the center of the slide frame and fasten a saw, which is so fastened by nuts or screws as to be set to saw to different widths as may be convenient. This saw is attached to a rod marked F, to which is applied a hand wheel for tension, by which the saw may be reversed or turned out of the way when using other parts of the machine and is confined to the designed place by a set screw in the sockets wherein the rod is placed as shown in the accompanying drawing. Near the saw is placed a chisel, which is attached to a rod marked G, by a set screw and holder into which the chisel is inserted. To this rod G is fastened a hand wheel for turning the chisel. When using the chisel the saw should be reversed or turned out of the way. When using the saw the chisel should be removed or raised upward and fastened by one of the set screws. When using the smoothing plane the boards should be run forcibly against it. They will then be squared and smoothed or jointed at the same time. The part for tenoning should be used in the same manner. The slide frame or saw gate $b, b, b, b, b$, is attached to the shaft or crank $d$, above, by couplings or joints, as may be seen in the drawings, to which I apply a fly wheel, 3 $c$, also a counterweight 5 $e, e$, to balance slide frame and also act as driving power when set in particular position on the fly wheel C when the machine is in motion, and the counterweight so adjusted.

The difficulty in the motion of the machine, which would arise from the chisel coming in contact with the wood, is removed on the stationary frame at $j, j$. I fasten movable stops, by nuts and bolts, for holding down the lumber for use. In front of the bench I fasten hand wheel $h$, which is attached to a gage $h$, by a rod with a screw at the end thereof, the rod running through the bench and is thus connected to the gage $h$ (which is moved backward and forward by said screw when turning the wheel. The said gage to be used when mortising or sawing). Below is a footstep $i$ with rods attached to slide frame on which the foot is set, which, being pressed downward, the machine is put in motion.

What I claim as my invention and desire to secure by Letters Patent is—

The improvement on a machine for mortising, tenoning, sawing, and smoothing by combining certain tools together, used by carpenters in the manufacture of doors, sash, and blinds, as herein described.

ELIHU STREET.

Witnesses:
H. AUGUSTINE SMITH,
THEODORE C. SMITH.